United States Patent
Yoshida et al.

(10) Patent No.: US 6,774,615 B2
(45) Date of Patent: Aug. 10, 2004

(54) RESONANCE-FREQUENCY MEASURING METHOD DETERMINING A RESONANCE FREQUENCY BY COUNTING THE NUMBER OF OFF-TRACK OCCURRENCES

(75) Inventors: Susumu Yoshida, Kawasaki (JP);
Shuichi Hashimoto, Kawasaki (JP);
Ryuki Kubohara, Kawasaki (JP);
Tatsuhiko Kosugi, Kawasaki (JP);
Takeyori Hara, Kawasaki (JP);
Yoshiyuki Kagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 10/056,865

(22) Filed: Jan. 25, 2002

(65) Prior Publication Data

US 2003/0057935 A1 Mar. 27, 2003

(30) Foreign Application Priority Data

Sep. 13, 2001 (JP) .......................... 2001-278612

(51) Int. Cl.$^7$ .......................... G06M 1/10; G11B 17/00; G01M 1/00
(52) U.S. Cl. .......................... 324/76.48; 73/579; 73/660; 369/247
(58) Field of Search .......................... 324/76.61, 76.39, 324/76.48, 76.62, 76.29, 76.44, 76.49, 76.21; 360/77.04, 79.14, 25, 81, 78.11, 53, 69, 77.08; 369/47.23, 124.06, 53.37, 247; 73/579, 660; 714/32, 824

(56) References Cited

U.S. PATENT DOCUMENTS

| | | | | |
|---|---|---|---|---|
| 2002/0041472 A1 | * | 4/2002 | Ding et al. | 360/290 |
| 2002/0131342 A1 | * | 9/2002 | Kadlec et al. | 369/44.29 |
| 2003/0016462 A1 | * | 1/2003 | Gong et al. | 360/31 |
| 2003/0133212 A1 | * | 7/2003 | Fulkerson et al. | 360/25 |

\* cited by examiner

Primary Examiner—N. Le
Assistant Examiner—Donald M Lair
(74) Attorney, Agent, or Firm—Greer, Burns & Crain, Ltd.

(57) ABSTRACT

A resonance-frequency measuring method is used for measuring a resonance frequency of an information recording/reproducing device reproducing information recorded on a medium by driving a mechanism unit. The resonance-frequency measuring method comprises the measuring step of applying sine-wave oscillations at different frequencies one by one to the mechanism unit, and counting the number of times information reproduced upon application of each of the sine-wave oscillations differs from information indicating an aimed location, and the resonance-frequency determining step of determining the resonance frequency according to the number of times counted in the measuring step.

4 Claims, 16 Drawing Sheets

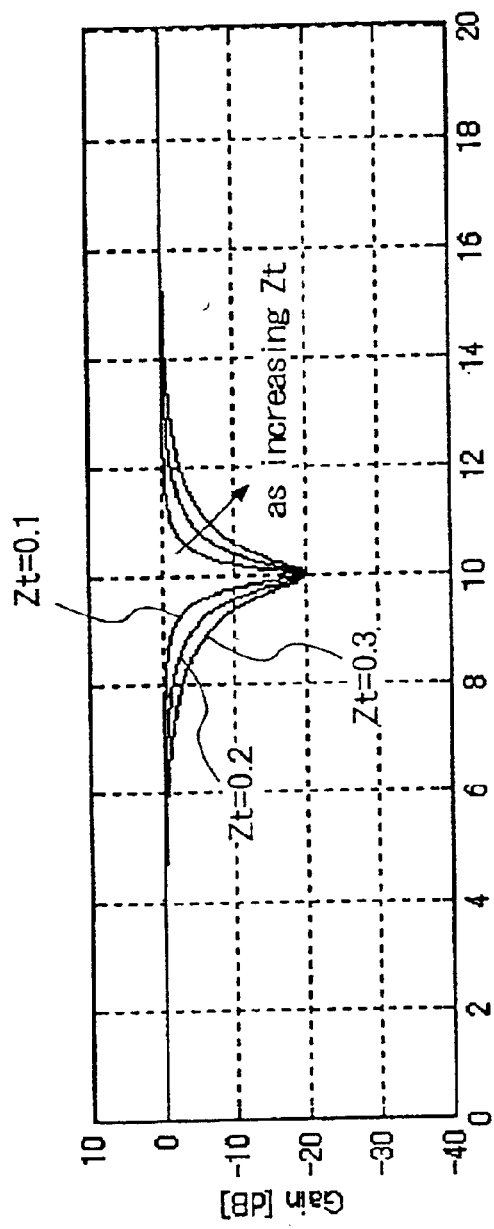
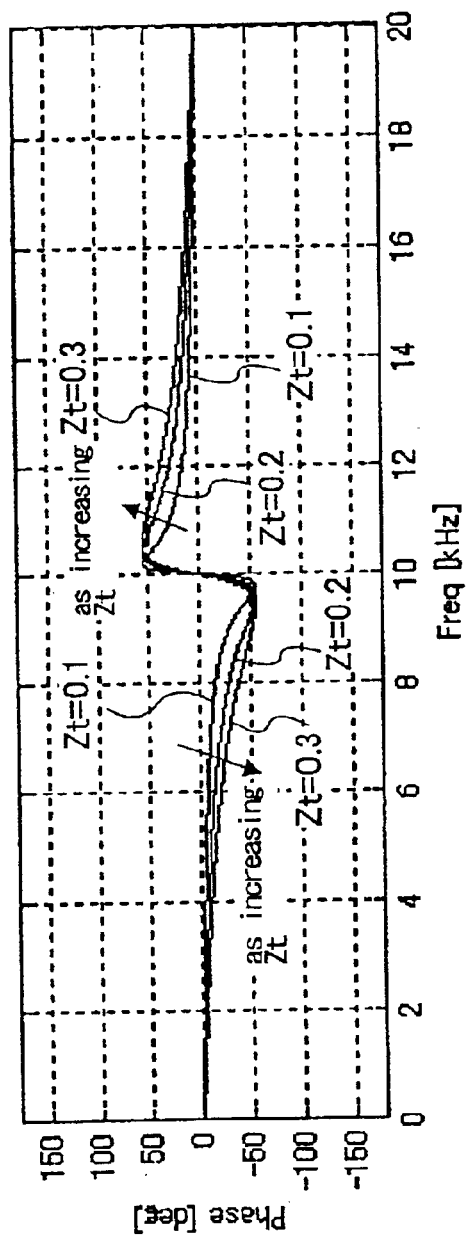
FIG. 7A
FIG. 7B

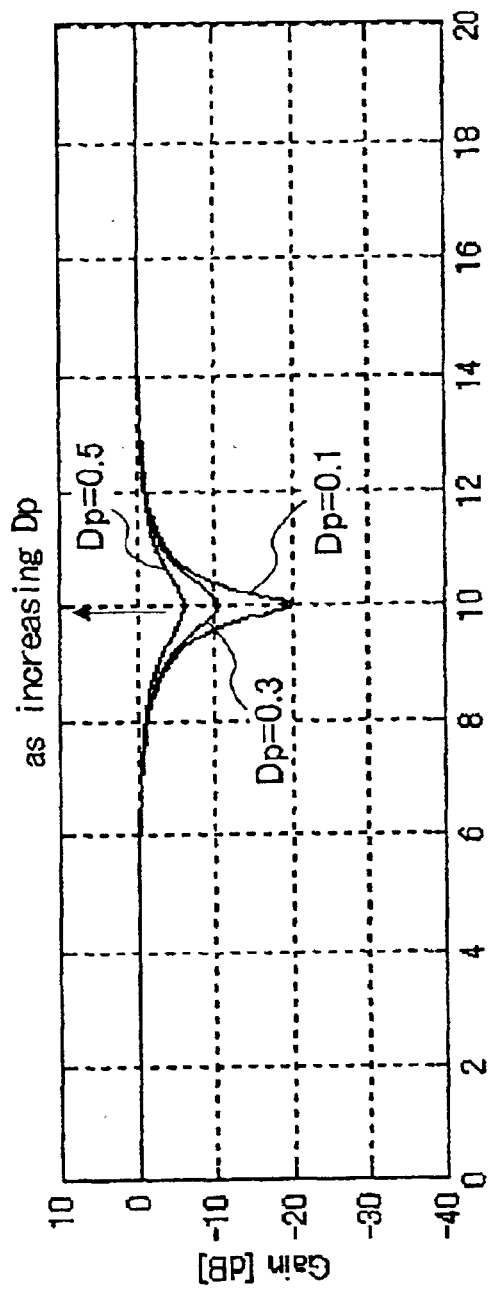
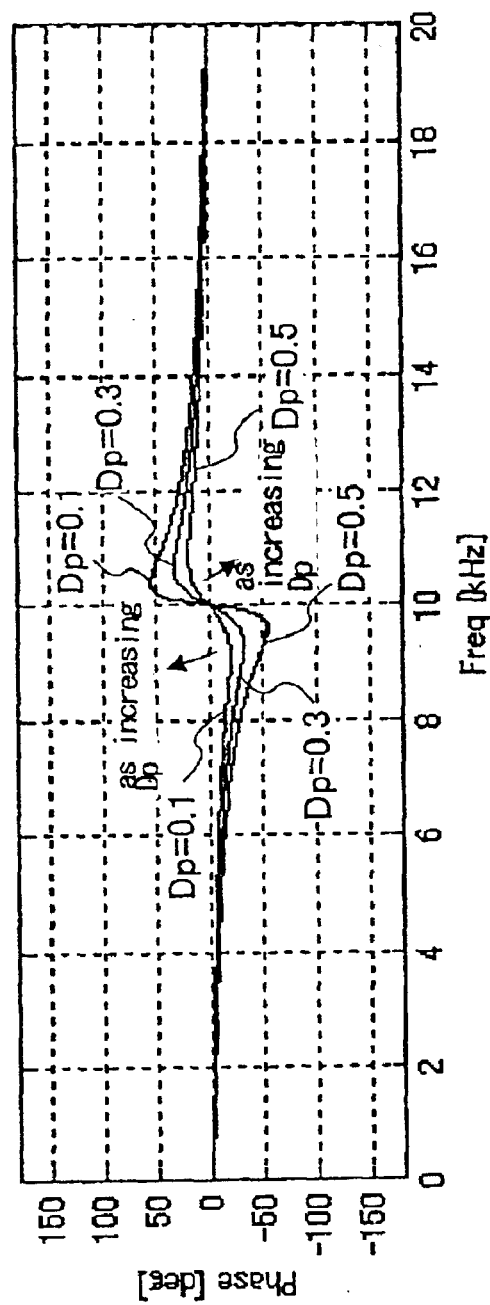
FIG. 8A
FIG. 8B

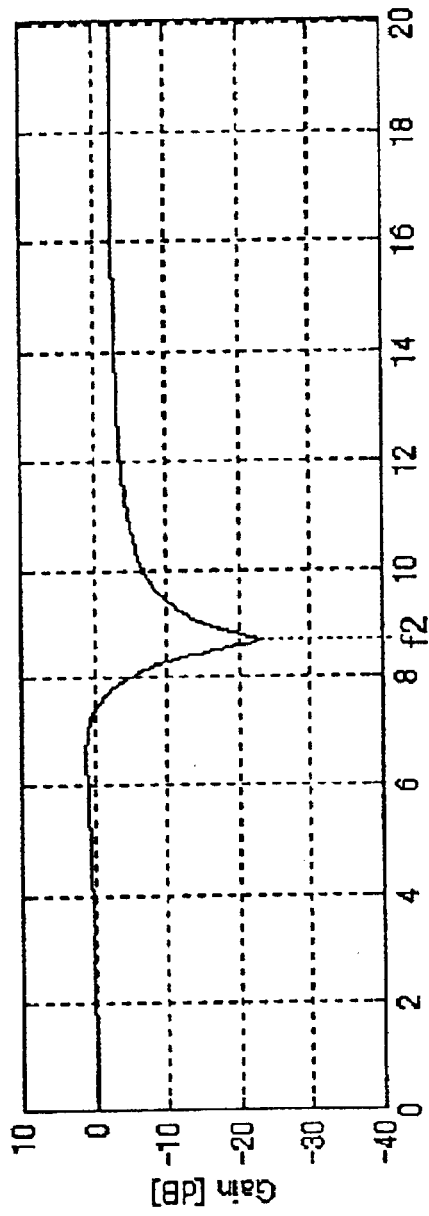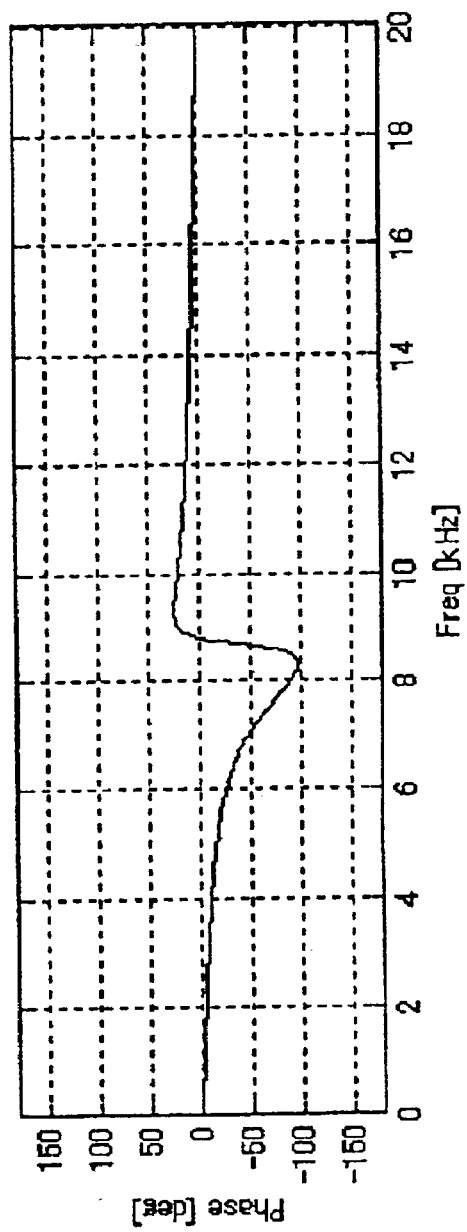
FIG. 11A
FIG. 11B

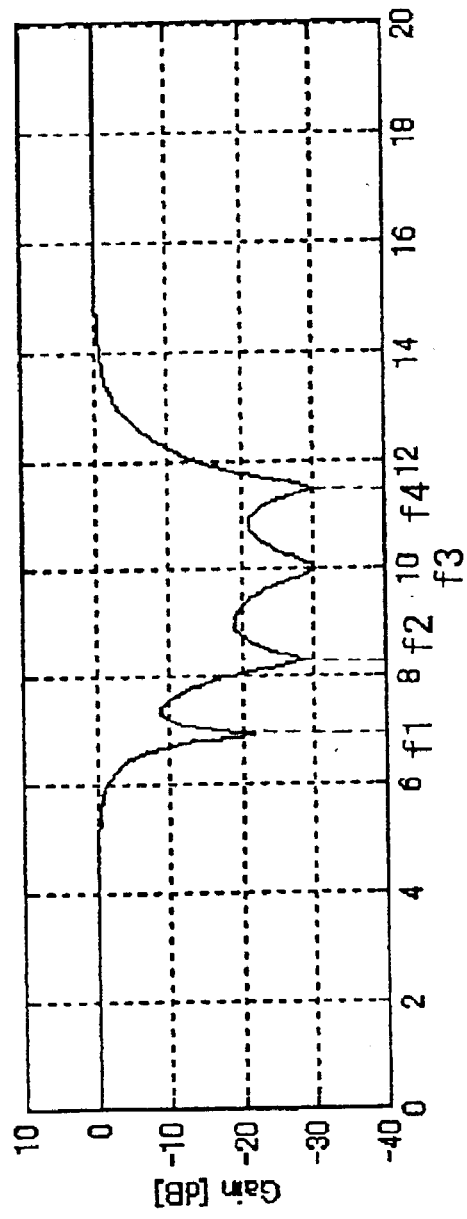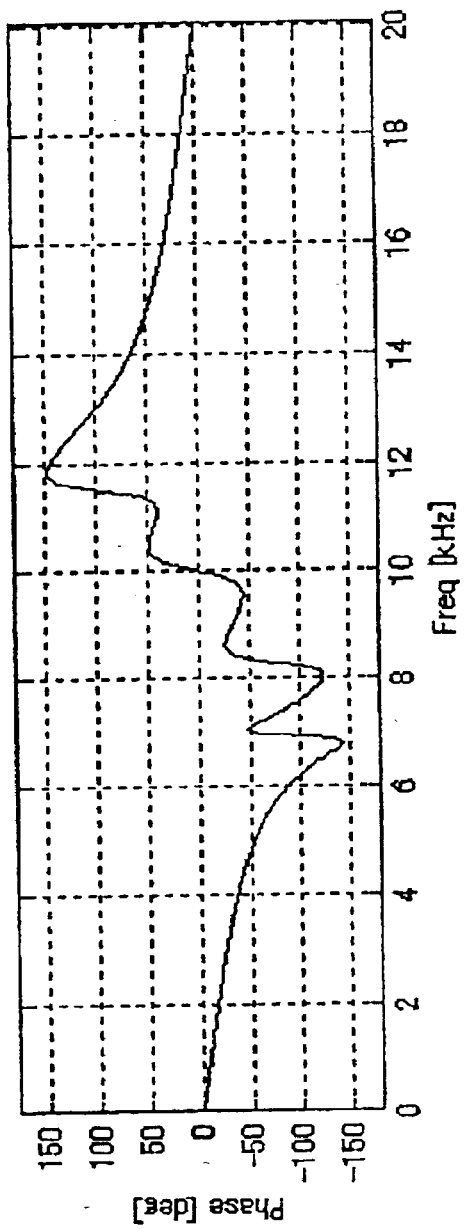
FIG. 14A
FIG. 14B

US 6,774,615 B2

RESONANCE-FREQUENCY MEASURING METHOD DETERMINING A RESONANCE FREQUENCY BY COUNTING THE NUMBER OF OFF-TRACK OCCURRENCES

BACKGROUND OF THE INVENTION

1. Field of the Invention

The present invention generally relates to a resonance-frequency measuring method used for an information recording and/or reproducing device, an information recording and/or reproducing device, and an electric filter, and, more particularly, to a resonance-frequency measuring method for measuring a resonance frequency of a mechanism unit of an information recording and/or reproducing device driven by the mechanism unit to record and/or reproduce information, an information recording and/or reproducing device, and an electric filter.

An information recording and/or reproducing device, such as a hard disk drive, is required to record and/or reproduce information at a high speed with a high recording density. These requirements raise a problem of head vibration due to a resonance of a mechanism unit. In order to repress a resonance component of the mechanism unit, such an information recording and/or reproducing device incorporates a notch filter for removing a resonance component from a head-driving signal. Since mechanism units of different devices have different resonance frequencies, a cutoff frequency of the notch filter needs to be set individually by measuring a resonance frequency for each different device. Therefore, an efficient method for measuring a resonance frequency has been desired.

2. Description of the Related Art

First, a description will be given, with reference to the drawings, of a hard disk drive.

FIG. 1A is a cross-sectional view of a structure of a hard disk drive. FIG. 1B is a plan view of the structure of the hard disk drive. FIG. 2 is a block diagram of the hard disk drive.

A hard disk drive 1 mainly comprises a disk enclosure 11 and a circuit assembly 12. The disk enclosure 11 contains a magnetic disk 21, a spindle motor 22, a magnetic head 23, a head arm 24, a voice coil motor 25 (a mechanism unit), and a head IC (Integrated Circuit) 26. The magnetic disk 21 is fixed to a rotating shaft of the spindle motor 22, and revolves in accordance with the rotation of the spindle motor 22.

The magnetic head 23 is arranged opposite the magnetic disk 21, and acts magnetically on the magnetic disk 21 so as to record and/or reproduce information. The magnetic head 23 is fixed on an end of the head arm 24. The head arm 24 is coupled with the voice coil motor 25 at the other end so as to be revolved by the voice coil motor 25. Along with the revolution of the head arm 24, the magnetic head 23 moves in a radial direction of the magnetic disk 21.

The magnetic head 23 is connected to the head IC 26. The head IC 26 amplifies a signal that is to be recorded on the magnetic disk 21 by the magnetic head 23, and supplies the amplified signal to the magnetic head 23. The head IC 26 also amplifies a reproduction signal that is reproduced from the magnetic disk 21 by the magnetic head 23, and supplies the amplified reproduction signal to the circuit assembly 12.

As shown in FIG. 2, the circuit assembly 12 includes a read channel (RDC) 31, an MPU (Micro Processing Unit) 32, a ROM (Read Only Memory) 33, a servo controller (SVC) 34 (an actuator; a driving unit), a hard disk controller (HDC) 35, a RAM (Random Access Memory) 36, and an IDE (Integrated Device Electronics) connector 37.

The read channel 31 is connected with the head IC 26. The read channel 31 supplies a record signal to the head IC 26, and also demodulates a reproduction signal amplified by the head IC 26 into reproduction data. The reproduction data demodulated by the read channel 31 is supplied to the HDC 35. The HDC 35 temporarily stores the reproduction data in the RAM 36, and thereafter, supplies the reproduction data to a host computer (not shown in the figure) via the IDE connector 37.

Record data is supplied from the host computer to the IDE connector 37. The HDC 35 temporarily stores the record data in the RAM 36. Upon recording, the HDC 35 reads the record data from the RAM 36, and supplies the record data to the read channel 31. The read channel 31 modulates the record data so as to generate a record signal. The record signal generated by the read channel 31 is supplied to the head IC 26. The head IC 26 amplifies the record signal, and supplies the amplified record signal to the magnetic head 23. The magnetic head 23 magnetizes the magnetic disk 21 by producing a magnetic field corresponding to the record signal so as to record the record signal on the magnetic disk 21.

In the above-mentioned course, the MPU 32 is supplied with the reproduction data demodulated by the read channel 31. The MPU 32 reads a location signal (a present location signal) indicating an address on the magnetic disk 21 from the reproduction data, and performs a tracking servo control. The MPU 32 generates a control signal, i.e., a tracking error signal, corresponding to a difference between the read location signal and a location signal (an aimed location signal) representing a location where aimed information is recorded, and performs a notch-filter process to the generated control signal. Thereafter, the MPU 32 supplies the control signal to the servo controller 34. The notch-filter process removes a device's natural resonance frequency component from the control signal.

The servo controller 34 controls the voice coil motor 25 according to the control signal supplied from the MPU 32 so as to regulate a reading position of the magnetic head 23 reading a signal from the magnetic disk 21.

Thus, the magnetic head 23 can scan the aimed location on the magnetic disk 21 so as to obtain the aimed information.

In this course, the voice coil motor 25 exhibits a device-specific resonance frequency. Therefore, a firmware executed by the MPU 32 includes a resonance-frequency measuring process for measuring the device-specific resonance frequency so as to match a cutoff frequency in the notch-filter process to the device-specific resonance frequency.

FIG. 3 is a functional block diagram of a conventional example of a tracking servo control system.

It is noted that a subtracter 41, a controller 42, a notch filter 43, an adder 44, a sine-wave disturbance generator 45, an FFT calculator 46, and an adjuster 47 are realized by the firmware as processes of the MPU 32.

The subtracter 41 is supplied with the aimed location signal and the present location signal, and calculates the difference between the aimed location signal and the present location signal so as to output difference information. The difference information is supplied to the controller 42. Based on the difference information supplied from the subtracter 41, the controller 42 generates the control signal for controlling the voice coil motor 25.

The control signal generated by the controller 42 is supplied to the notch filter 43. The notch filter 43 deducts a preset cutoff frequency component from the control signal. The control signal without the unnecessary component is supplied from the notch filter 43 to the adder 44. The adder 44 adds a sine-wave disturbance signal supplied from the sine-wave disturbance generator 45 to the control signal supplied from the notch filter 43. The control signal including the sine-wave disturbance signal is supplied to the servo controller 34.

Based on the control signal supplied from the adder 44, the servo controller 34 generates a driving signal for driving the voice coil motor 25. The driving signal generated by the servo controller 34 is supplied to the voice coil motor 25. The voice coil motor 25 is driven by the driving signal supplied from the servo controller 34 so as to alter a position of the magnetic head 23.

The magnetic head 23 reads a signal from the magnetic disk 21 at the altered position. This reproduction signal reproduced by the magnetic head 23 is supplied to the head IC 26. The head IC 26 amplifies the reproduction signal supplied from the magnetic head 23. The reproduction signal amplified by the head IC 26 is supplied to the read channel 31. The read channel 31 demodulates the reproduction signal so as to obtain reproduction information. A location signal included in the reproduction information is supplied, as the present location signal, to the subtracter 41 and the FFT (Fast Fourier Transform) calculator 46. The FFT calculator 46 performs an FFT process so as to calculate amplitude of the location signal.

The amplitude of the location signal calculated in the FFT calculator 46 is supplied to the adjuster 47. The adjuster 47 detects a frequency of the sine-wave disturbance signal generated by the sine-wave disturbance generator 45 that maximizes the calculation result, i.e., the amplitude of the location signal, of the FFT calculator 46 by varying the frequency of the sine-wave disturbance signal and obtaining the calculation result of the FFT calculator 46. The adjuster 47 sets the detected maximizing frequency as the cutoff frequency in the notch filter 43.

Besides, in order to calculate the amplitude of the location signal, a DFT (Discrete Fourier Transform Analysis) calculator and a Max-Min difference calculator are generally used in addition to the FFT calculator 46.

In measuring the resonance frequency in the conventional hard disk drive, the resonance frequency is calculated by the FFT calculator 46, the DFT calculator and the Max-Min difference calculator. However, there have been problems, such as that the FFT calculation, the DFT calculation and the Max-Min difference calculation are so complicated, and require large memory usage.

SUMMARY OF THE INVENTION

It is a general object of the present invention to provide an improved and useful resonance-frequency measuring method and an electric filter in which the above-mentioned problems are eliminated.

A more specific object of the present invention is to provide a resonance-frequency measuring method which can measure a resonance frequency with simple processes, and an electric filter which can deal with varying resonance frequencies.

In order to achieve the above-mentioned objects, a resonance frequency of an information recording/reproducing device is measured by applying sine-wave oscillations at different frequencies one by one to the mechanism unit of the information recording/reproducing device reproducing information recorded on a medium by driving the mechanism unit, counting the number of times information reproduced upon application of each of the sine-wave oscillations differs from information indicating an aimed location, and determining the resonance frequency according to the number of times counted as above.

According to the present invention, since the resonance frequency can be determined by counting the number of off-track occurrences, complicated calculations, such as an FFT calculation, and a DFT calculation need not to be performed. Thus, programs of a smaller scale can realize this method with using only a smaller memory area storing those programs. Also, this method only requires a smaller work memory used upon executing the programs. Accordingly, the information recording/reproducing device needs to have only a small memory capacity.

Additionally, in the present invention, the sine-wave oscillations are applied to the mechanism unit by adding sine-wave signals at different frequencies one by one to a control signal controlling an actuator to drive the mechanism unit.

According to the present invention, the oscillations can be applied not directly to the mechanism unit, but in the form of signals, which can be realized by a simple structure.

In order to achieve the above-mentioned objects, there is also provided an electric filter comprising a plurality of notch filters combined so as to have a predetermined notch filter characteristic, the notch filters having different frequency characteristics.

Additionally, in the present invention, the notch filters may include:
 a first notch filter having a first cutoff frequency and exhibiting substantially symmetrical gain changes at frequencies below and above the first cutoff frequency;
 a second notch filter having a second cutoff frequency lower than the first cutoff frequency, and exhibiting a smaller amount of gain changes and a smaller maximum gain at frequencies below the second cutoff frequency than an amount of gain changes and a maximum gain at frequencies above the second cutoff frequency; and
 a third notch filter having a third cutoff frequency higher than the first cutoff frequency, and exhibiting a larger amount of gain changes and a larger maximum gain at frequencies below the third cutoff frequency than an amount of gain changes and a maximum gain at frequencies above the third cutoff frequency.

According to the present invention, combining a plurality of notch filters having different frequency characteristics can extend a suppression frequency band in which gains are suppressed. In this structure, making gain changes asymmetrical can extend the suppression frequency band without deteriorating the gain suppression.

Other objects, features and advantages of the present invention will become more apparent from the following detailed description when read in conjunction with the accompanying drawings.

BRIEF DESCRIPTION OF THE DRAWINGS

FIG. 7A and FIG. 7B show a frequency characteristic and a phase characteristic, respectively, of a notch filter according to an embodiment of the present invention, when a frequency band of the notch filter is varied;

FIG. 8A and FIG. 8B show a frequency characteristic and a phase characteristic of the notch filter, respectively, when a gain of the notch filter is varied;

FIG. 11A and FIG. 11B show a frequency-gain characteristic and a frequency-phase characteristic, respectively, when N=1.33;

FIG. 14A shows a synthesis of the frequency characteristics shown in FIG. 10A, FIG. 11A and FIG. 12A;

FIG. 14B shows a synthesis of the phase characteristics shown in FIG. 10B, FIG. 11B and FIG. 12B;

DETAILED DESCRIPTION OF THE PREFERRED EMBODIMENTS

Descriptions will now be given, with reference to the drawings, of embodiments according to the present invention.

First, a description will be given of a resonance-frequency measuring method used for a hard disk drive (an information recording and/or reproducing device) according to an embodiment of the present invention.

The hard disk drive according to the present embodiment has a similar structure to the structure of the conventional hard disk drive shown in FIG. 1A to FIG. 3, except for processes of a firmware stored in the ROM 33.

Figures 1A, 1B:
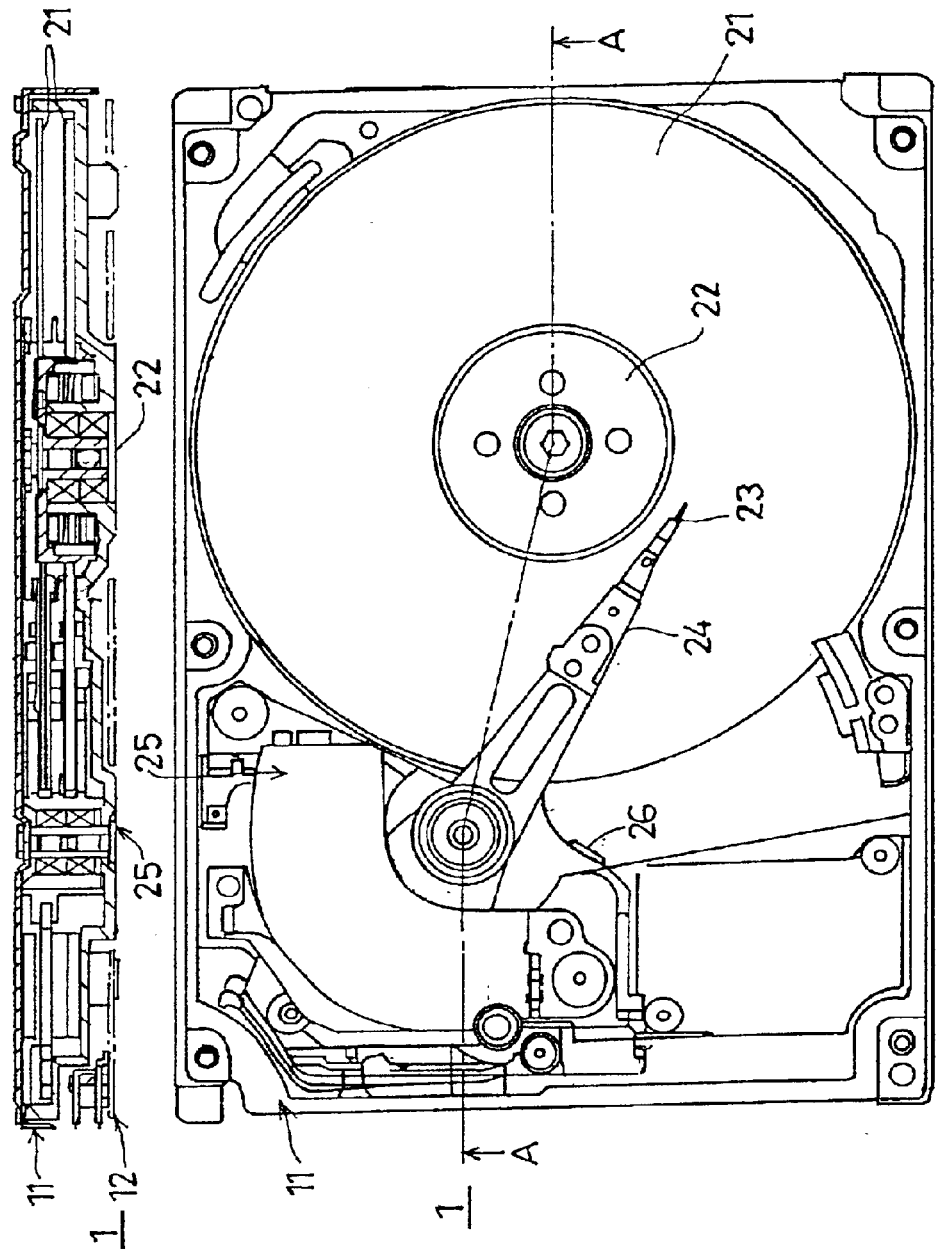
FIG. 1A is a cross-sectional view of a structure of a hard disk drive.
FIG. 1B is a plan view of the structure of the hard disk drive.
Figure 2:
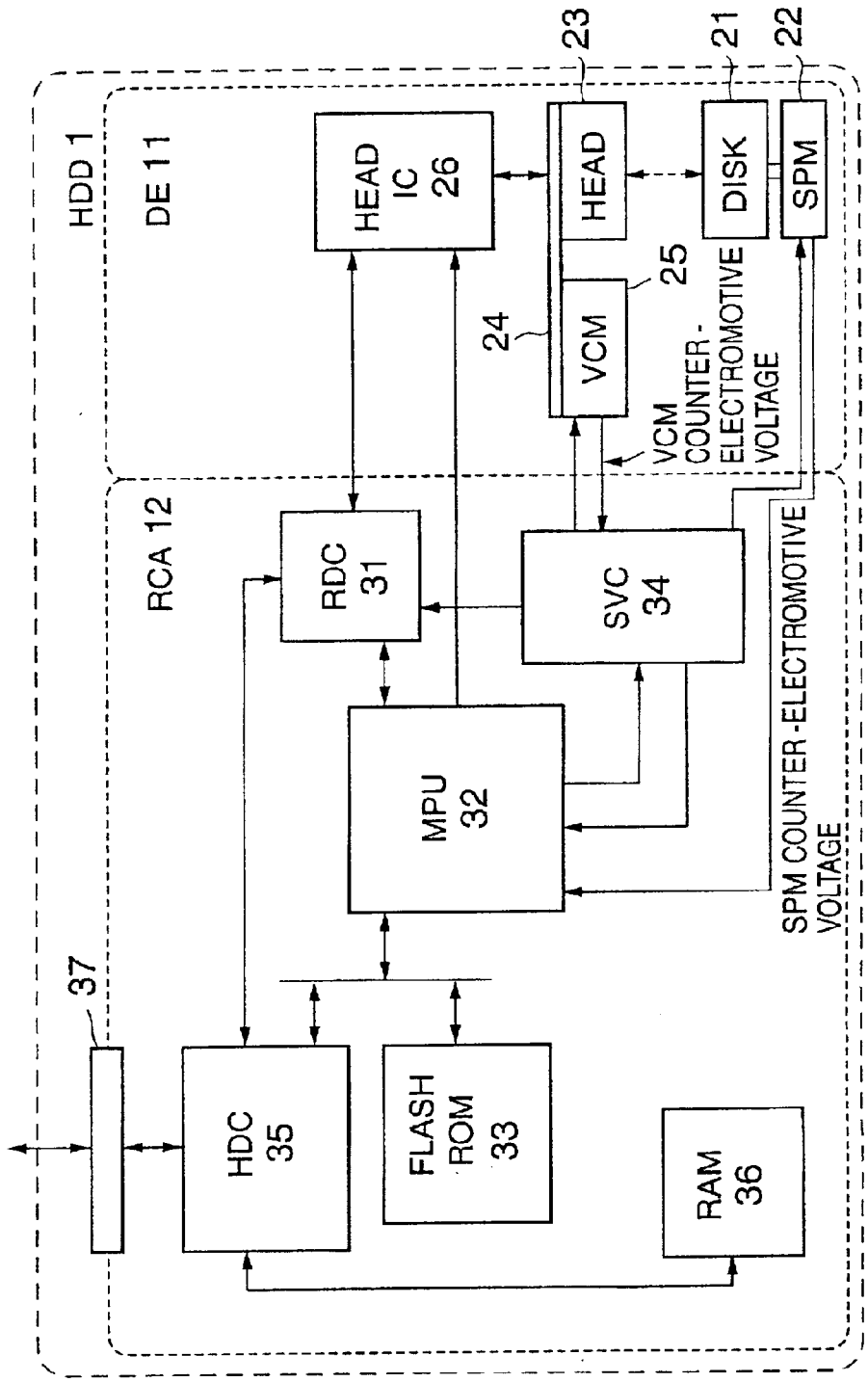
FIG. 2 is a block diagram of the hard disk drive.
Figure 3:
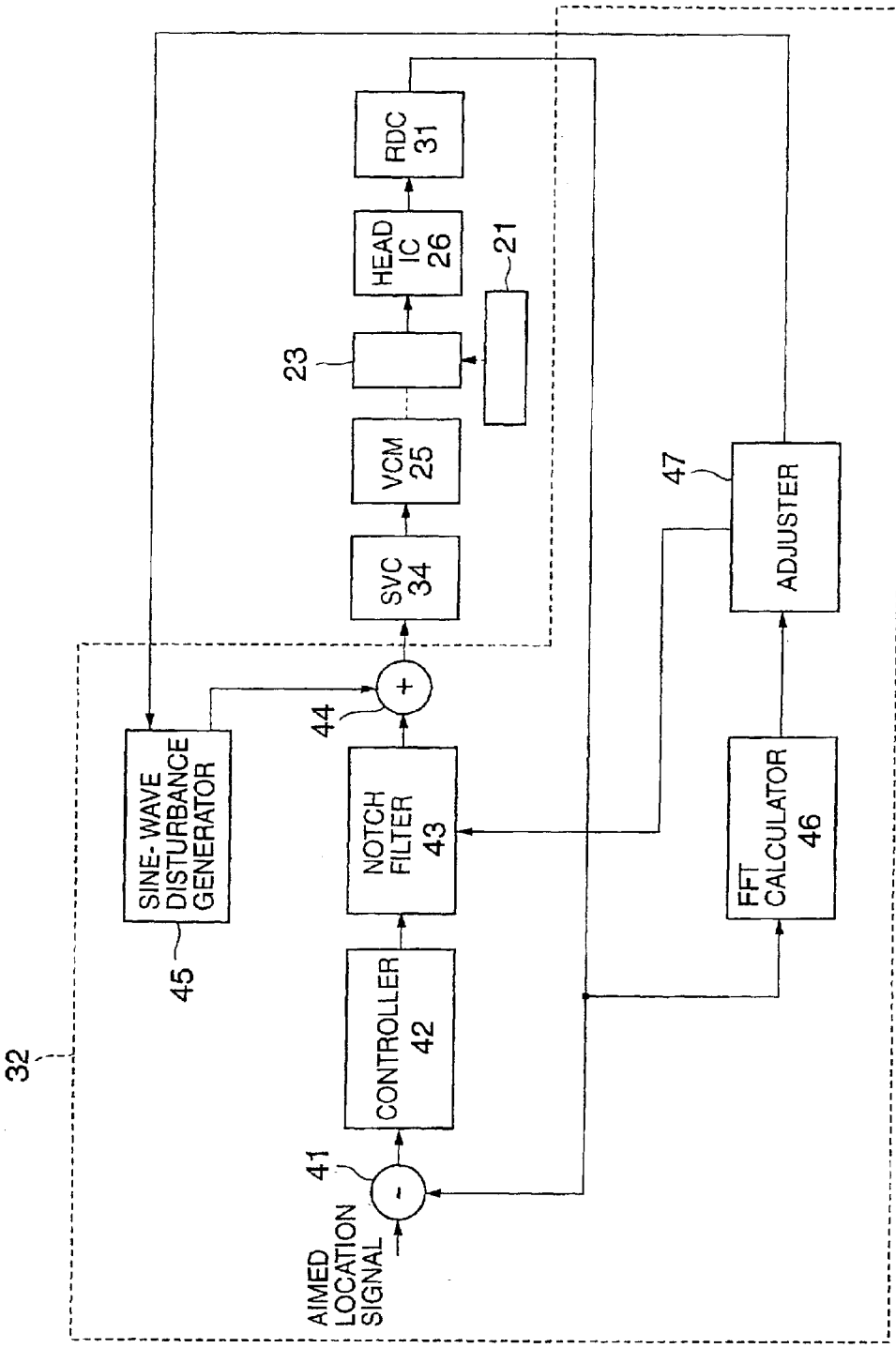
FIG. 3 is a functional block diagram of a conventional example of a tracking servo control system.
Figure 4:
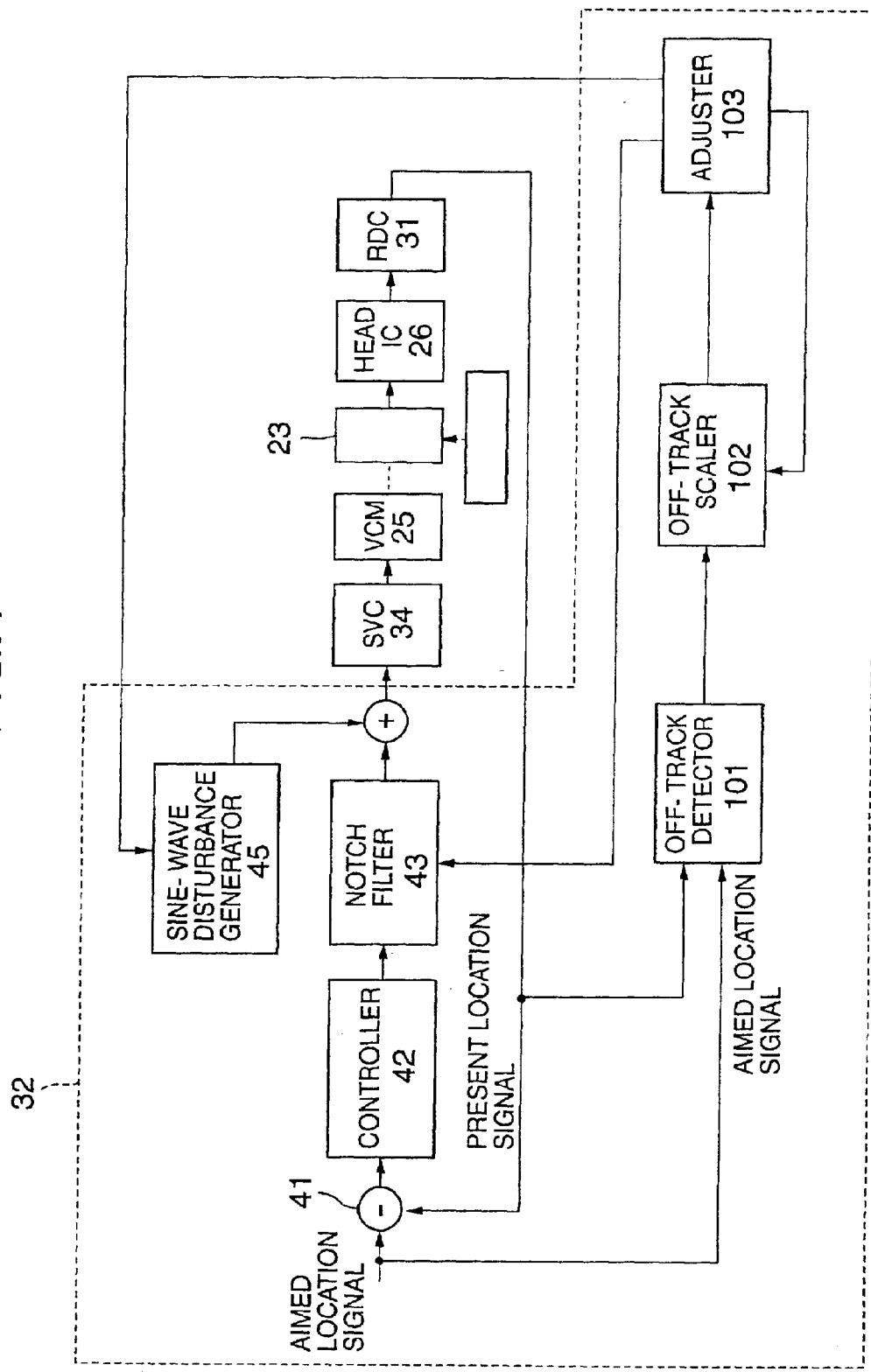
FIG. 4 is a functional block diagram of a tracking servo system according to an embodiment of the present invention.

FIG. 4 is a functional block diagram of a tracking servo system according to an embodiment of the present invention. Elements in FIG. 4 that are identical to the elements shown in FIG. 3 are referenced by the same reference marks, and will not be described in detail.

The tracking servo system of the hard disk drive according to the present embodiment comprises an off-track detector 101, an off-track scaler 102, and an adjuster 103, instead of the FFT calculator 46 and the adjuster 47 shown in FIG. 3. The off-track detector 101, the off-track scaler 102, and the adjuster 103 form a measuring means. The adjuster 103 forms a resonance-frequency determining means and a filter adjusting means.

The off-track detector 101 is supplied with the aimed location signal from the HDC 35, and is also supplied with the present location signal from the read channel (RDC) 31. The off-track detector 101 compares the present location signal with the aimed location signal. When the present location signal derives from a track different from a track indicated by the aimed location signal, the off-track detector 101 judges that the present location is off-track, and supplies a pulse signal to the off-track scaler 102.

The off-track scaler 102 is a counter, which counts the pulse signal supplied from the off-track detector 101 during a predetermined scaling time. The off-track scaler 102 is cleared by the adjuster 103, and is provided with the scaling time by the adjuster 103. The adjuster 103 controls the entire system so as to determine the cutoff frequency used in the notch filter 43.

Figure 5:
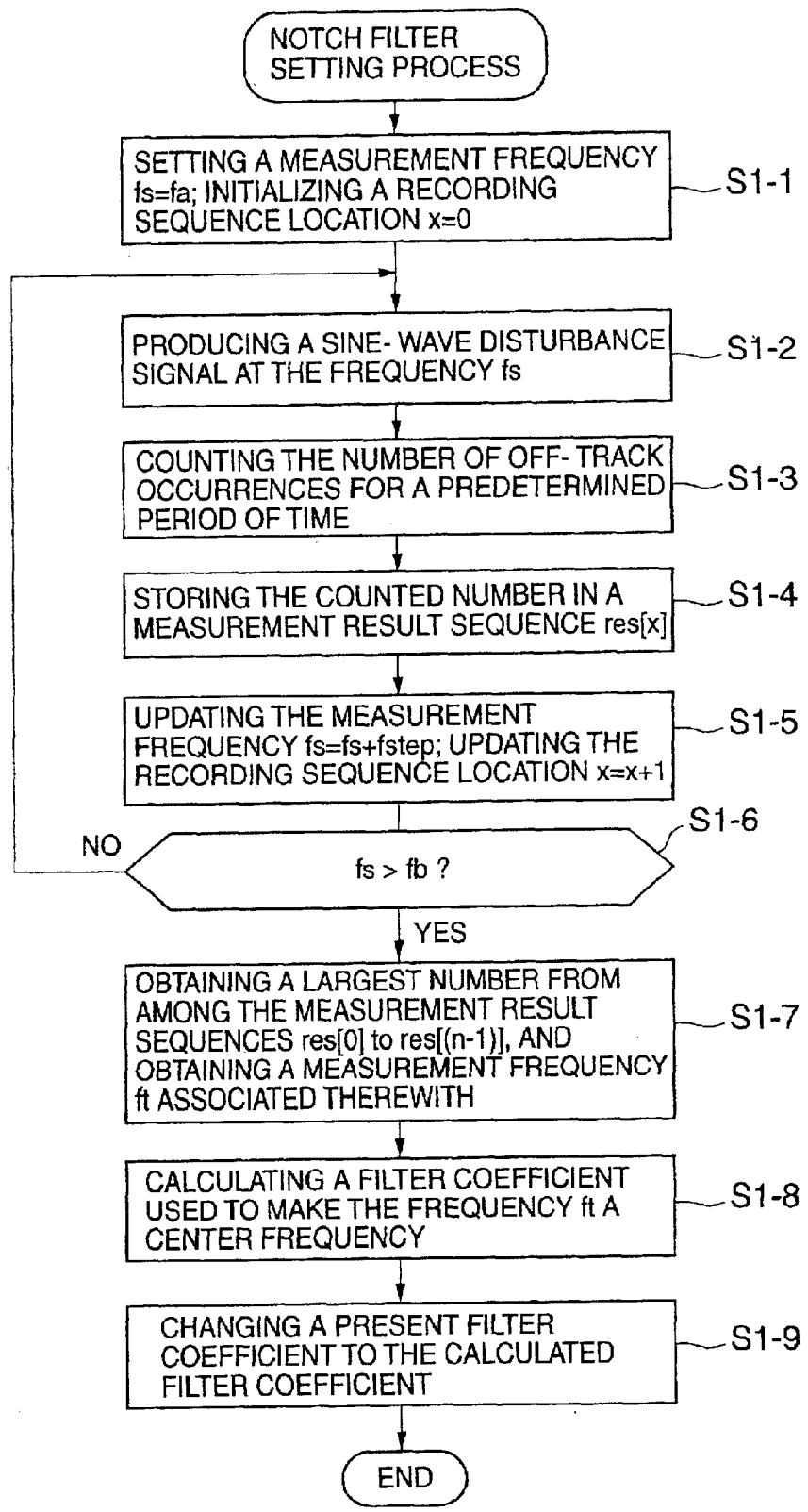
FIG. 5 is a flowchart of a notch filter setting process according to an embodiment of the present invention.
Figure 6:
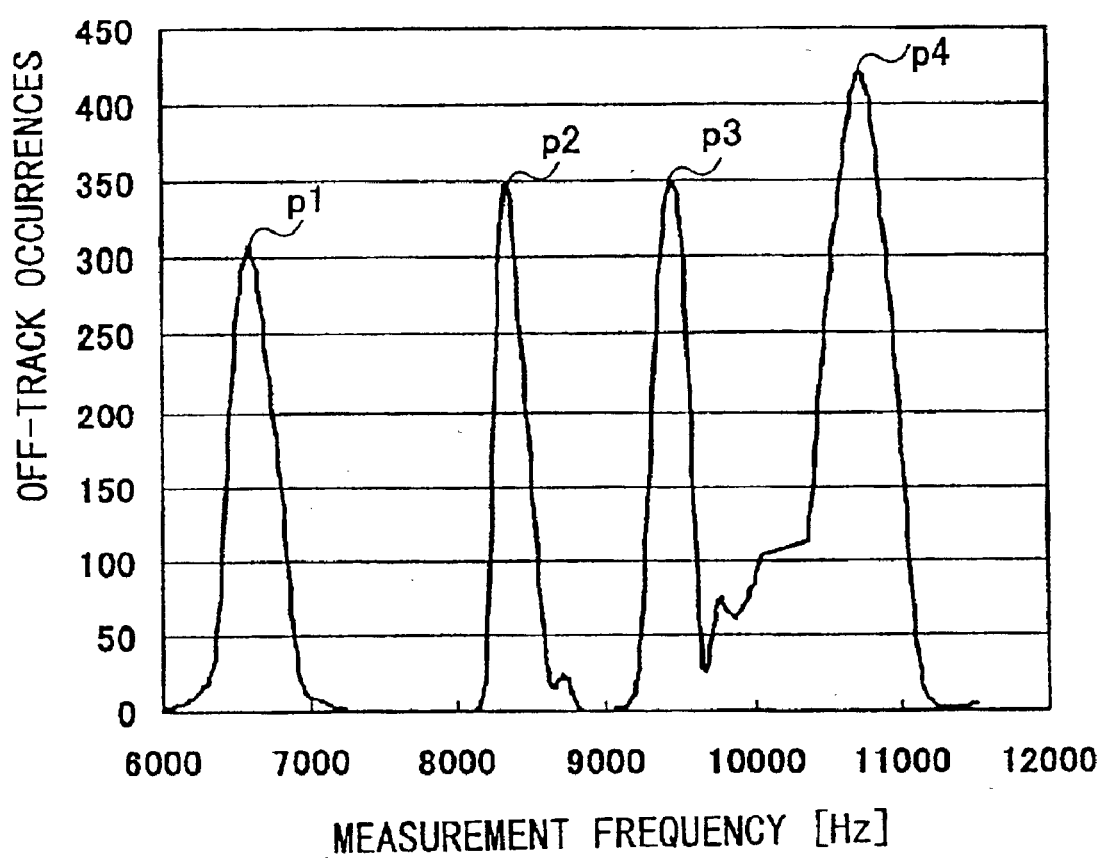
FIG. 6 is an illustration used for explaining the notch filter setting process.

FIG. 5 is a flowchart of a notch filter setting process according to an embodiment of the present invention. FIG. 6 is an illustration used for explaining the notch filter setting process.

The notch filter setting process is started upon the fulfillment of predetermined conditions, such as a reception of an externally supplied command, or internal errors occurring more than predetermined times.

First, in step S1-1 of the notch filter setting process, a measurement frequency fs is set to a predetermined frequency fa, and a recording sequence location x is initialized to "0" such that the magnetic head 23 is positioned on a predetermined track.

Next, in step S1-2, a sine-wave disturbance signal at the frequency fs is produced, and is added to a tracking error signal.

Next, in step S1-3, the number of off-track occurrences is counted for a predetermined period of time. The off-track is a state in which the magnetic head 23 is displaced from a track on the magnetic disk 21, the track originally to be followed by the magnetic head 23. The off-track state is detected by demodulating a signal detected by the magnetic head 23 into demodulated information by the read channel 31, recognizing an address from the demodulated information, and judging whether or not the recognized address derives from the track mentioned in the step S1-1 on which the magnetic head 23 is positioned.

The number of off-track occurrences is counted up when the address recognized from the reproduced information does not derive from the track mentioned in the step S1-1.

Subsequently, in step S1-4, the number of off-track occurrences counted for the predetermined period of time in step S1-3 is stored in a measurement result sequence res[x] preset in the MPU 32, or in a measurement result sequence res[x] preset in the RAM 36. Then, in step S1-5, the measurement frequency fs and the recording sequence location x are updated. The recording sequence location x is updated to (x+1), for example. The measurement frequency fs is updated to (fs+fstep), for example. In this expression, fs represents the present measurement frequency, and fstep represents a predetermined step frequency. That is, in this updating step, the measurement frequency fs is set to a frequency obtained by adding the step frequency fstep to the present measurement frequency.

Subsequently, in step S1-6, it is judged whether or not the updated measurement frequency fs exceeds a predetermined upper-limit frequency fb.

When it is judged in the step S1-6 that the updated measurement frequency fs is lower than the predetermined upper-limit frequency fb, the steps S1-2 to S1-5 are performed. When it is judged in the step S1-6 that the updated measurement frequency fs is higher than the predetermined upper-limit frequency fb, step S1-7 is performed. In the step S1-7, a largest number of off-track occurrences is obtained from among the numbers of off-track occurrences stored in the measurement result sequences res[0] to res[(n−1)], and a measurement frequency ft associated with the measurement result sequence res[x] (x=the recording sequence location) storing the largest number of off-track occurrences is obtained. It is noted that n in res[(n−1)] corresponds to the number of times the measurement frequency is updated.

FIG. 6 shows the relation between the measurement frequency fs and the number of off-track occurrences. As shown in FIG. 6, a plurality of peaks p1 to p4 are exhibited. By referring to these peaks, the measurement frequency ft corresponding to the largest number of off-track occurrences is obtained, and is set as the cutoff frequency used in the notch filter 43.

In step S1-8, a filter coefficient used to obtain a notch filter characteristic is calculated. The notch filter characteristic exhibits the measurement frequency ft as a center frequency.

Subsequently, in step S1-9, a filter coefficient presently set in the ROM 33 is changed to the filter coefficient calculated in the step S18.

The notch filter 43 is formed by a digital filter realized by processes of the MPU 32. A transfer function of a digital notch filter is generally represented by the following expression.

$$G(s)=(s^2+2D_pZ_t\,\Omega_c s+\Omega_c^2)/(s^2+2Z_t\,\Omega_c s+\Omega_c^2) \quad (1)$$

$\Omega_c$: a cutoff value
$Z_t$: a spread function
$D_p$: a depth function

FIG. 7A and FIG. 7B show a frequency characteristic and a phase characteristic of the notch filter, respectively, when a frequency band of the notch filter is varied. FIG. 8A and FIG. 8B show a frequency characteristic and a phase characteristic of the notch filter, respectively, when a gain of the notch filter is varied.

The transfer function G(s) represented by the expression (1) has the characteristics of the notch filter as shown in FIG. 7A and FIG. 8A.

Increasing the value of the function $Z_t$ in the expression (1) spreads the frequency band, as shown in FIG. 7A. Decreasing the value of the function $D_p$ in the expression (1) deepens the gain, as shown in FIG. 8A.

Additionally, increasing the cutoff value $\Omega_c$ in the expression (1) increases the cutoff frequency fc. Decreasing the cutoff value $\Omega_c$ decreases the cutoff frequency fc.

The MPU 32 can set the above-mentioned cutoff value $\Omega_c$ in the ROM 33 as a parameter. In the above-mentioned step S1-9, the cutoff value $\Omega_c$ set in the ROM 33 is changed such that the cutoff frequency fc equals the measurement frequency ft corresponding to the largest number of off-track occurrences.

For example, the cutoff value $\Omega_c$ is in relation to the cutoff frequency fc as follows.

$\Omega_c=2\pi fc$ ($\pi$: the ratio of the circumference of a circle to its diameter; fc: the cutoff frequency)

Accordingly, the cutoff value $\Omega_c$ is so set that the cutoff frequency fc equals the measurement frequency ft corresponding to the largest number of off-track occurrences.

In the present embodiment, the off-track state is detected when the present location address is different from the aimed location address. However, the off-track state may be detected when the tracking error signal is lager than a predetermined amount.

According to the present embodiment, by varying the frequency of the sine-wave disturbance signal and counting the number of off-track occurrences for a predetermined period of time for each varied frequency, a frequency maximizing the number of off-track occurrences is set as a resonance frequency (corresponding to the cutoff frequency). Thus, in the present embodiment, the resonance frequency can be obtained by simpler processes with smaller memory usage than conventional calculations, such as the FFT calculation, the DFT calculation, and the Max-Min difference calculation.

Additionally, in the present embodiment, the cutoff frequency fc may be set in the notch filter 43 not only upon shipping the hard disk drive, but also may be reset upon starting the hard disk drive after the shipping, or when an error rate or the number of retries exceeds a predetermined value.

Besides, as described above, the present embodiment employs a normal digital notch filter represented by the expression (1) as the notch filter 43. However, the normal notch filter has a narrow suppression band. Accordingly, in cases that a mechanical resonance frequency of the information recording and/or reproducing device (the hard disk drive) differs from the cutoff frequency of the notch filter, an uncontrollable oscillation arises when the differing mechanical resonance frequency occurs. Therefore, a digital notch filter having an extended suppression band may be employed as the notch filter 43.

Figure 9:
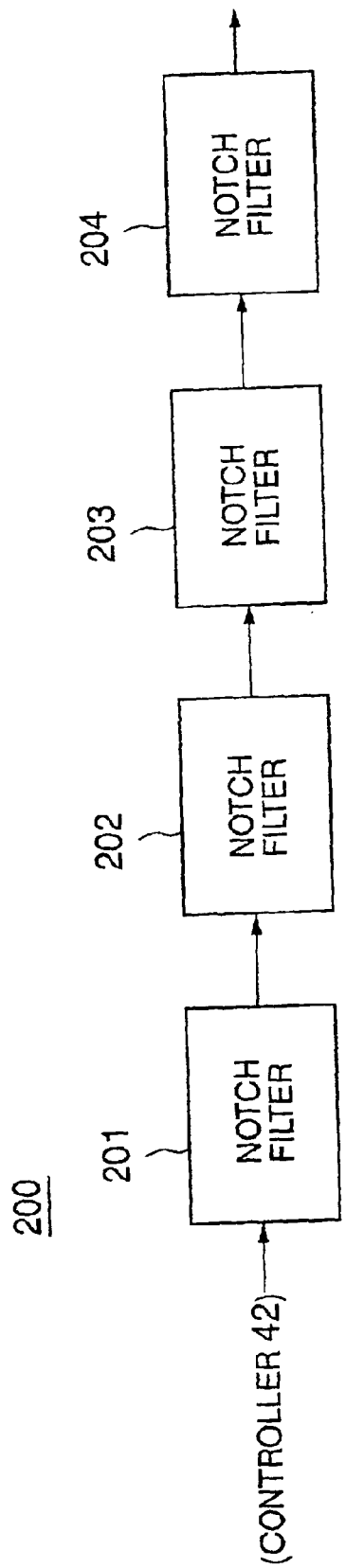
FIG. 9 is a block diagram of a variation of the notch filter.

FIG. 9 is a block diagram of a variation of the notch filter according to the above-described embodiment of the present invention.

A notch filter 200 according to the present variation comprises four notch filters 201 to 204. The notch filter 201 corresponds to a fourth notch filter. The notch filter 202 corresponds to a second notch filter. The notch filter 203 corresponds to a first notch filter. The notch filter 204 corresponds to a third notch filter.

The control signal supplied from the controller 42 is filtered through the notch filters 201 to 204 in series. Thereby, the control signal supplied from the controller 42 is subjected to the same process as when the control signal is filtered through one notch filter having one frequency characteristic equivalent to a synthesis of frequency characteristics of the notch filters 201 to 204.

The notch filter 201 has a normal filter characteristic with the cutoff frequency being f1.

The transfer function of a normal notch filter is represented by the foregoing expression (1).

The expression (1) can be z-transformed into the following expression (2).

$$G(z)=[(1+2D_pZ_tA+A^2)+2(A^2-1)Z^{-1}+(1-2D_pZ_tA+A^2)Z^{-2}]/[(1+2Z_tA+A^2)+2(A^2-1)Z^{-1}+(1-2Z_tA+A^2)Z^{-2}] \quad (2)$$

In the present variation, the expression (1) is changed to the following expression (3).

$$G(s)=(s^2+2D_pZ_t\,\Omega_c s+\Omega_c^2)/(ns^2+2Z_t\,\Omega_c s+\Omega_c^2) \quad (3)$$

In the expression (3), when s becomes larger, i.e., when the frequency becomes higher, terms other than $s^2$ become ignorable. Accordingly, the expression (3) can be expressed as follows.

$$G(s)=1/n \quad (4)$$

From this expression (4), it is understood that the gain of the notch filter can be varied by changing n.

The expression (3) can be z-transformed into the following expression (5).

$$G(z)=[(1+2D_pZ_rA+A^2)+2(A^2-1)Z^{-1}+(1-2D_pZ_rA+A^2)Z^{-2}]/[(N+2Z_rA+A^2)+2(A^2-N)Z^{-1}+(N-2Z_rA+A^2)Z^{-2}] \quad (5)$$

Besides, the notch filter 201 has a transfer function obtained by substituting "1" for N in the expression (5).

Figure 10A:
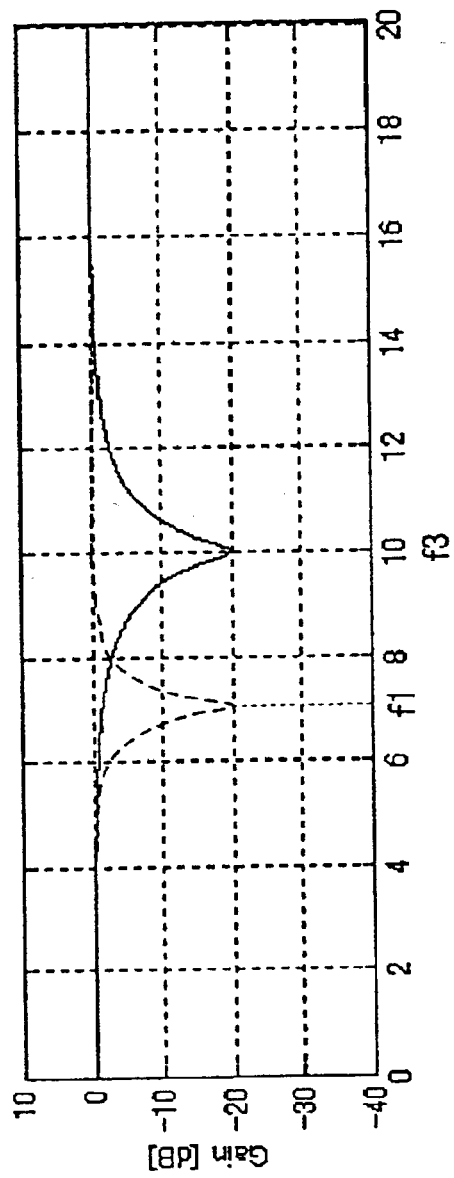
FIG. 10A and FIG. 10B show a frequency-gain characteristic and a frequency-phase characteristic, respectively, when N=1 in an expression representing a transfer function of a notch filter.
Figure 10B:
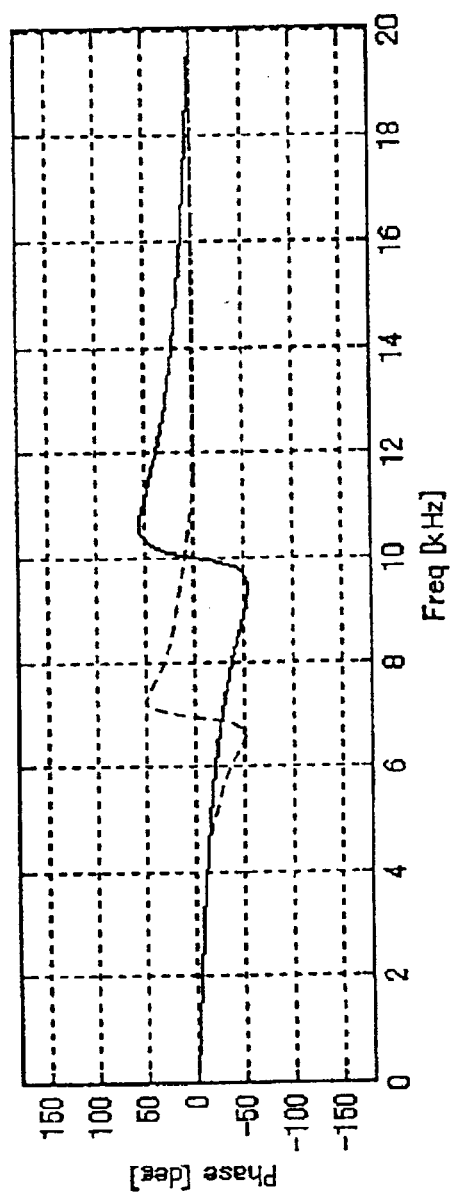

FIG. 10A and FIG. 10B show filter characteristics when N=1. FIG. 10A shows a frequency-gain characteristic. FIG. 10B shows a frequency-phase characteristic.

The notch filter 201 exhibits a symmetrical form with a center frequency at the center, as indicated by a broken line in FIG. 10A. The cutoff frequency of the notch filter 201 is set to f1.

The control signal filtered through the notch filter 201 is supplied to the notch filter 202. The notch filter 202 has a transfer function obtained by substituting "1.33" for N in the expression (5).

FIG. 11A and FIG. 11B show filter characteristics when N=1.33. FIG. 11A shows a frequency-gain characteristic. FIG. 11B shows a frequency-phase characteristic.

The cutoff frequency of the notch filter 202 is set to f2. As shown in FIG. 11A, the notch filter 202 exhibits a larger gain at frequencies below the cutoff frequency f2 than at frequencies above the cutoff frequency f2. The cutoff frequency f2 is higher than the cutoff frequency f1.

The control signal filtered through the notch filter 202 is supplied to the notch filter 203. The notch filter 203 has a transfer function obtained by substituting "1" for N in the expression (5). The notch filter 203 has characteristics indicated by solid lines in FIG. 10A and FIG. 10B. The cutoff frequency of the notch filter 203 is set to f3. The cutoff frequency f3 is higher than the cutoff frequency f2. For example, the cutoff frequency f3 is set to the resonance frequency obtained as described above.

The control signal filtered through the notch filter 203 is supplied to the notch filter 204. The notch filter 204 has a transfer function obtained by substituting "0.75" for N in the expression (5).

Figure 12A:
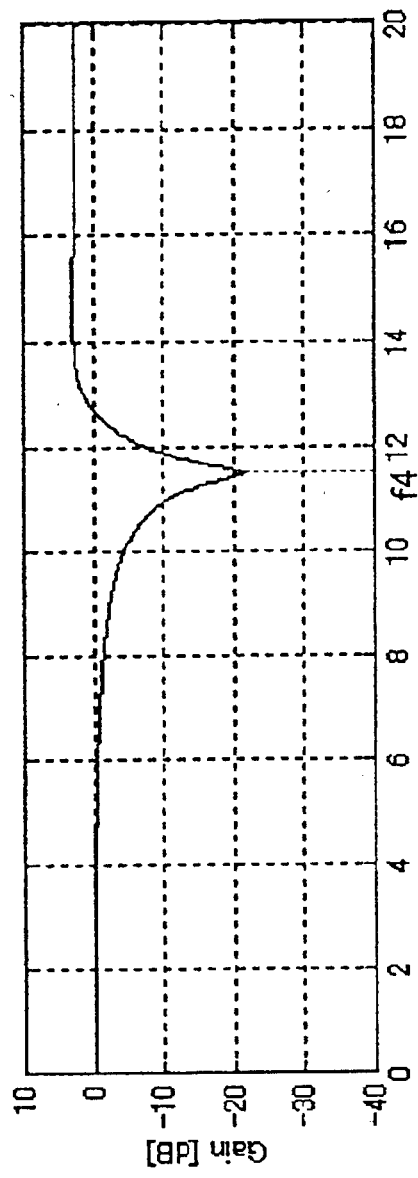
FIG. 12A and FIG. 12B show a frequency-gain characteristic and a frequency-phase characteristic, respectively, when N=0.75.
Figure 12B:
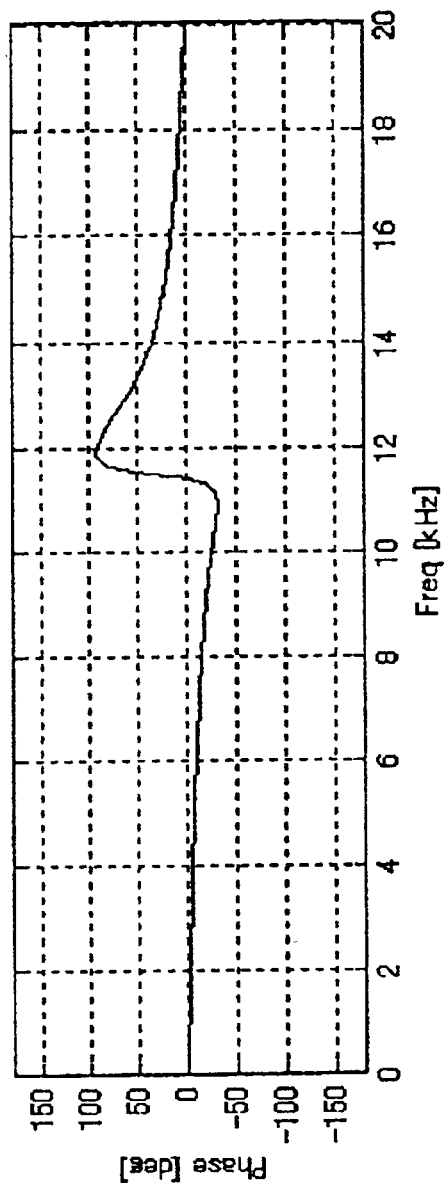

FIG. 12A and FIG. 12B show filter characteristics when N=0.75. FIG. 12A shows a frequency-gain characteristic. FIG. 12B shows a frequency-phase characteristic.

The cutoff frequency of the notch filter 204 is set to f4. As shown in FIG. 12A, the notch filter 204 exhibits a larger gain at frequencies above the cutoff frequency f4 than at frequencies below the cutoff frequency f4. The cutoff frequency f4 is higher than the cutoff frequency f3.

Figure 13A:
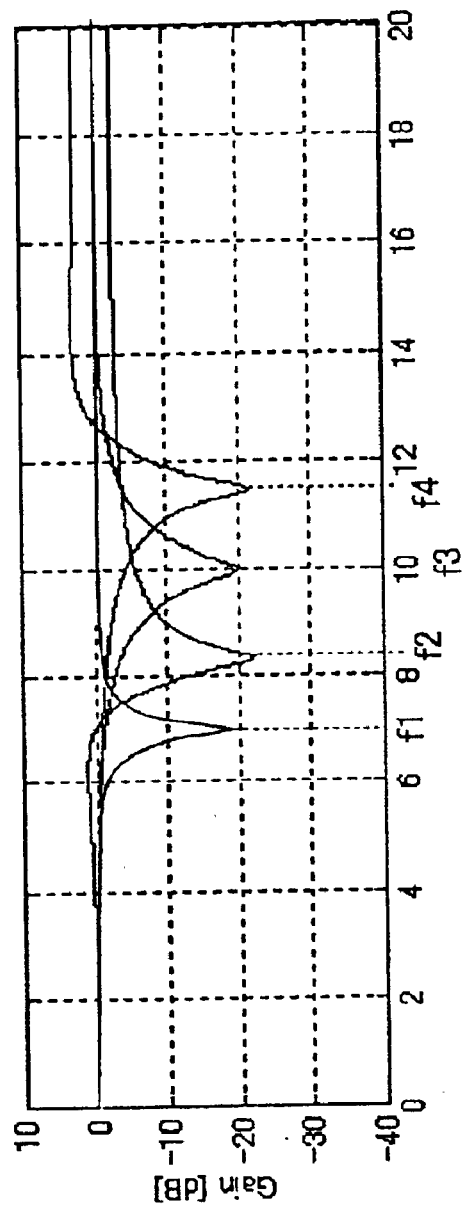
FIG. 13A shows the frequency characteristics shown in FIG. 10A, FIG. 11A and FIG. 12A overlapped on one another.
Figure 13B:
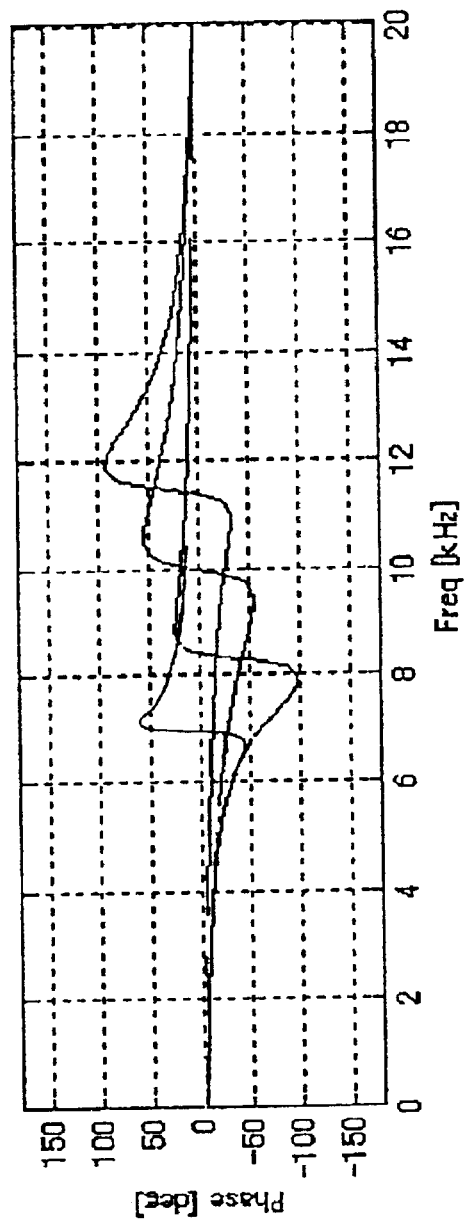
FIG. 13B shows the phase characteristics shown in FIG. 10B, FIG. 11B and FIG. 12B overlapped on one another.

FIG. 13A shows the frequency characteristics of the notch filters 201 to 204 overlapped on one another. FIG. 13B shows the phase characteristics of the notch filters 201 to 204 overlapped on one another. FIG. 14A shows a synthesis of the frequency characteristics of the notch filters 201 to 204. FIG. 14B shows a synthesis of the phase characteristics of the notch filters 201 to 204.

Synthesizing the frequency characteristics of the notch filters 201 to 204 shown in FIG. 13A forms the characteristic shown in FIG. 14A. As shown in FIG. 14A, a sufficiently large attenuation of substantially 30 dB can be obtained in a wide frequency band ranging from the frequency f2 to the frequency f4.

Also, due to the frequency characteristic of the notch filter 201, a quality factor Q can be relaxed at low frequencies so as to realize an attenuation in the wide frequency band extended to the low frequencies.

Figure 15A:
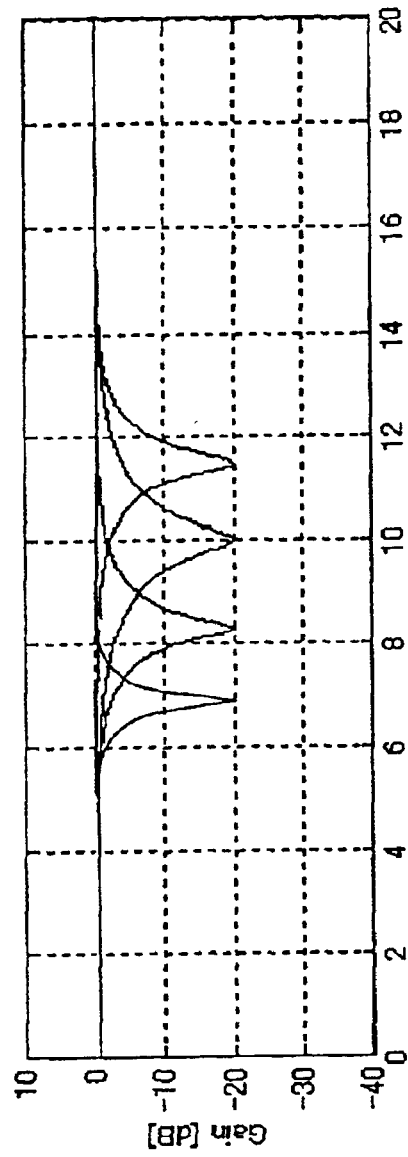
FIG. 15A shows frequency characteristics of normal notch filters having different cutoff frequencies, overlapped on one another.
Figure 15B:
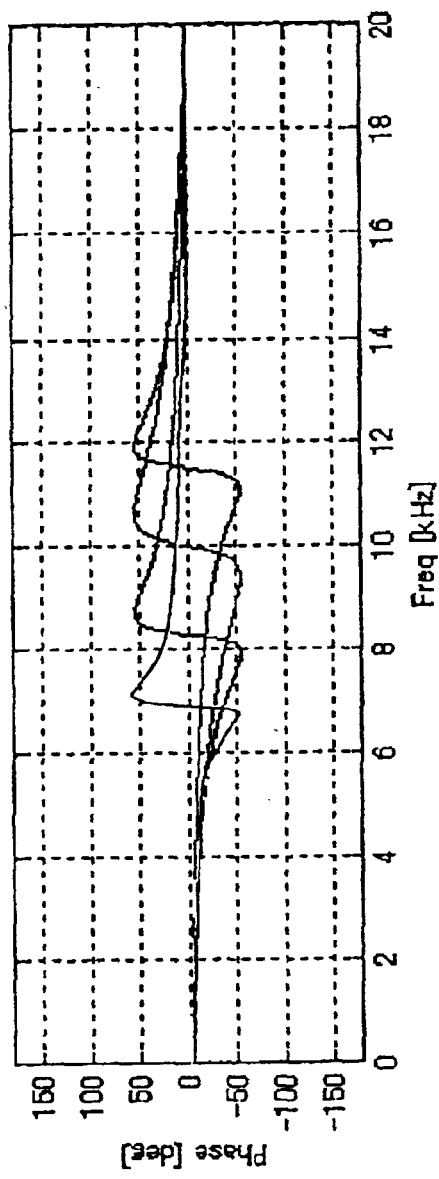
FIG. 15B shows phase characteristics of the normal notch filters, overlapped on one another.

FIG. 15A to FIG. 16B are graphs used for explaining characteristics synthesized from characteristics of normal notch filters having different frequencies. FIG. 15A shows the frequency characteristic of the normal notch filter 201 having the cutoff frequency f1 and the transfer function obtained by substituting "1" for N in the expression (5), a frequency characteristic of the notch filter 202 having the cutoff frequency f2 and the transfer function obtained by substituting "1" for N in the expression (5), a frequency characteristic of the notch filter 203 having the cutoff frequency f3 and the transfer function obtained by substituting "1" for N in the expression (5), and a frequency characteristic of the notch filter 204 having the cutoff frequency f4 and the transfer function obtained by substituting "1" for N in the expression (5). In FIG. 15A, these four frequency characteristics are overlapped on one another. FIG. 15B shows the phase characteristic of the normal notch filter 201 having the cutoff frequency f1 and the transfer function obtained by substituting "1" for N in the expression (5), a phase characteristic of the notch filter 202 having the cutoff frequency f2 and the transfer function obtained by substituting "1" for N in the expression (5), a phase characteristic of the notch filter 203 having the cutoff frequency f3 and the transfer function obtained by substituting "1" for N in the expression (5), and a phase characteristic of the notch filter 204 having the cutoff frequency f4 and the transfer function obtained by substituting "1" for N in the expression (5). In FIG. 15B, these four phase characteristics are overlapped on one another.

Figure 16A:
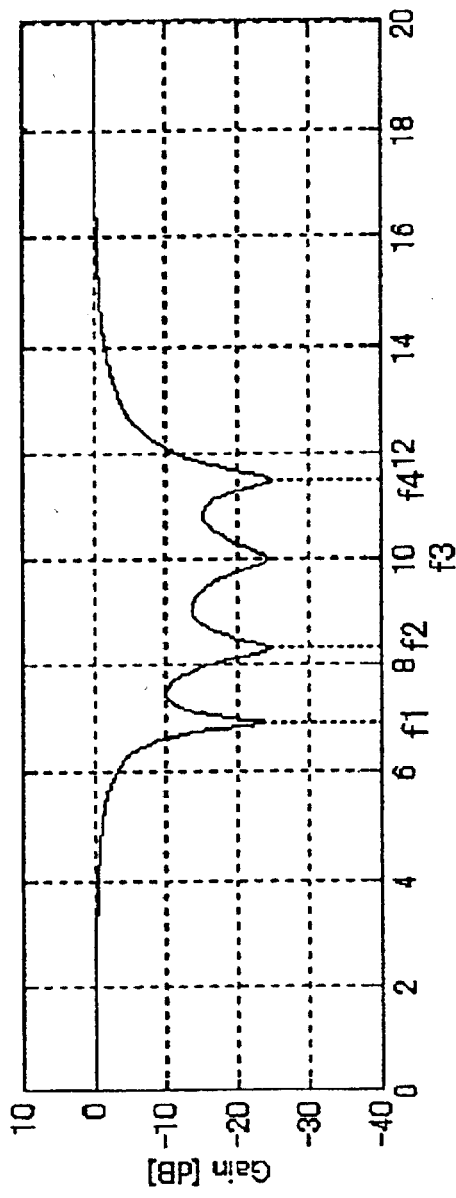
FIG. 16A shows a synthesis of the frequency characteristics shown in FIG. 15A.
Figure 16B:
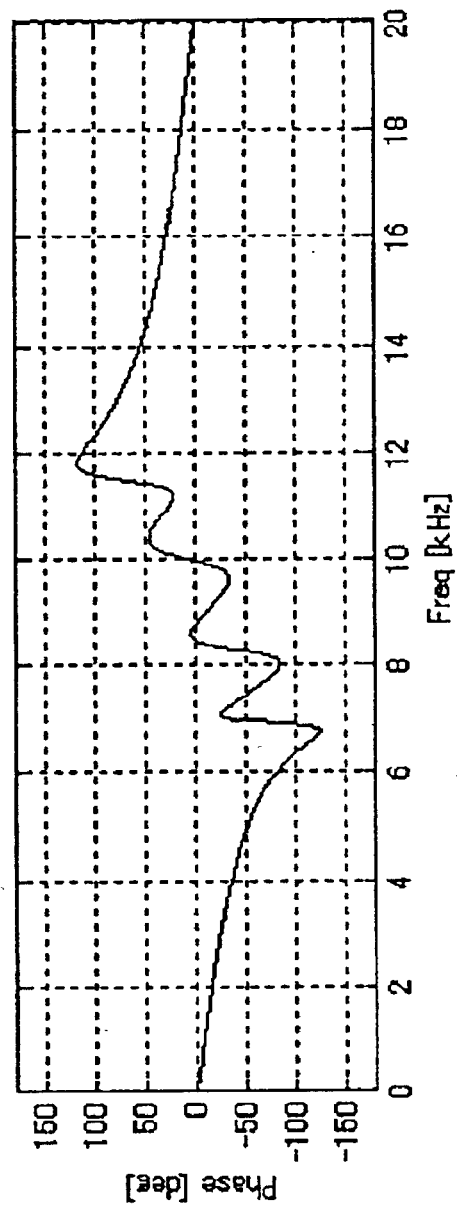
FIG. 16B shows a synthesis of the phase characteristic shown in FIG. 15B.

FIG. 16A shows a synthesis of the frequency characteristic of the notch filter 201 having the cutoff frequency f1 and the transfer function obtained by substituting "1" for N in the expression (5), the frequency characteristic of the notch filter 202 having the cutoff frequency f2 and the transfer function obtained by substituting "1" for N in the expression (5), the frequency characteristic of the notch filter 203 having the cutoff frequency f3 and the transfer function obtained by substituting "1" for N in the expression (5), and the frequency characteristic of the notch filter 204 having the cutoff frequency f4 and the transfer function obtained by substituting "1" for N in the expression (5). FIG. 16B shows a synthesis of the phase characteristic of the notch filter 201 having the cutoff frequency f1 and the transfer function obtained by substituting "1" for N in the expression (5), the phase characteristic of the notch filter 202 having the cutoff frequency f2 and the transfer function obtained by substituting "1" for N in the expression (5), the phase characteristic of the notch filter 203 having the cutoff frequency f3 and the transfer function obtained by substituting "1" for N in the expression (5), and the phase characteristic of the notch filter 204 having the cutoff frequency f4 and the transfer function obtained by substituting "1" for N in the expression (5).

When the frequency characteristics shown in FIG. 15A are synthesized as shown in FIG. 16A, gains at the cutoff frequencies f1 to f4 are not very large being approximately 20 dB. However, according to the present variation, the notch filters 201 and 203 are combined with the notch filters 202 and 204 exhibiting asymmetrical gain changes on opposite sides of the cutoff frequency f2/f4. Thereby, sufficiently deep gains of 30 dB can be achieved at the cutoff frequencies f1 to f4. In addition, according to the present variation, the phase characteristic shown in FIG. 14B is substantially the same as shown in FIG. 16B.

As described above, according to the present variation, even when the frequency band of the notch filter is extended, the deep gains can be obtained. Therefore, even when the resonance frequency differs from the cutoff frequency, the resonance frequency component can be surely removed.

In the present variation, the cutoff frequency f3 of the notch filter 203 is set to the resonance frequency measured in the above-described notch filter setting process shown in FIG. 5. However, the cutoff frequency f2 of the notch filter 202 may be set to the above-mentioned resonance frequency. Furthermore, the cutoff frequency f2 of the notch filter 202 and the cutoff frequency f3 of the notch filter 203 may be set such that a frequency therebetween becomes the above-mentioned resonance frequency. That is, the cutoff frequencies may be so set as to easily deal with the differing resonance frequency.

Additionally, since the notch filter 200 according to the present variation has a wide frequency band of attenuation, the notch filter 200 is also able to cut out the resonance frequency component from the control signal simply by setting the cutoff frequency of the notch filter to the resonance frequency measured beforehand, without measuring a resonance frequency for each different device and matching the cutoff frequency to the measured resonance frequency of each different device.

In addition, although the above-described embodiments set forth the hard disk drive provided with the resonance-frequency measuring method and the electric filter according to the present invention, embodiments of the present invention are not limited to the hard disk drive; the present invention is also applicable to other devices, such as an optical disk device and a tape device. Further, the present invention is applicable to a device in general which reproduces information recorded on a medium by a mechanism unit thereof.

The present invention is not limited to the specifically disclosed embodiments, and variations and modifications may be made without departing from the scope of the present invention.

The present application is based on Japanese priority application No. 2001-278612 filed on Sep. 13, 2001, the entire contents of which are hereby incorporated by reference.

What is claimed is:

1. A resonance-frequency measuring method for measuring a resonance frequency of an information recording/reproducing device reproducing information recorded on a medium by driving a mechanism unit, the method comprising:

the measuring step of applying sine-wave oscillations at different frequencies one by one to said mechanism unit, and counting the number of times information reproduced upon application of each of said sine-wave oscillations differs from information indicating an aimed location; and the resonance-frequency determining step of determining said resonance frequency according to said number of times counted in said measuring step.

2. The resonance-frequency measuring method as claimed in claim 1, wherein said measuring step applies said sine-wave oscillations to said mechanism unit by adding sine-wave signals at different frequencies one by one to a control signal controlling an actuator to drive said mechanism unit.

3. The resonance-frequency measuring method as claimed in claim 2, wherein said resonance-frequency determining step judges a frequency of the sine-wave signal maximizing said number of times to be said resonance frequency.

4. The resonance-frequency measuring method as claimed in claim 1, wherein said resonance-frequency determining step judges a frequency of the sine-wave oscillation maximizing said number of times to be said resonance frequency.

* * * * *

UNITED STATES PATENT AND TRADEMARK OFFICE
CERTIFICATE OF CORRECTION

PATENT NO.    : 6,774,615 B2
DATED         : August 10, 2004
INVENTOR(S)   : Yoshida et al.

It is certified that error appears in the above-identified patent and that said Letters Patent is hereby corrected as shown below:

<u>Title page,</u>
Item [75], Inventors, please delete the following inventors: "Ryuki Kubohara", "Tatsuhiko Kosugi", "Takeyori Hara" and "Yoshiyuki Kagami".

Signed and Sealed this

Seventh Day of December, 2004

JON W. DUDAS
*Director of the United States Patent and Trademark Office*